(12) United States Patent
Haskins, Jr.

(10) Patent No.: US 9,395,984 B2
(45) Date of Patent: Jul. 19, 2016

(54) SWAPPING BRANCH DIRECTION HISTORY(IES) IN RESPONSE TO A BRANCH PREDICTION TABLE SWAP INSTRUCTION(S), AND RELATED SYSTEMS AND METHODS

(75) Inventor: John William Haskins, Jr., Wake Forest, NC (US)

(73) Assignee: QUALCOMM Incorporated, San Diego, CA (US)

( * ) Notice: Subject to any disclaimer, the term of this patent is extended or adjusted under 35 U.S.C. 154(b) by 963 days.

(21) Appl. No.: 13/611,597

(22) Filed: Sep. 12, 2012

(65) Prior Publication Data

US 2014/0075166 A1    Mar. 13, 2014

(51) Int. Cl.
    *G06F 9/00*     (2006.01)
    *G06F 9/30*     (2006.01)
    *G06F 9/38*     (2006.01)

(52) U.S. Cl.
    CPC ............ *G06F 9/3005* (2013.01); *G06F 9/3848* (2013.01)

(58) Field of Classification Search
    CPC .............................. G06F 9/3848; G06F 9/3005
    See application file for complete search history.

(56) References Cited

U.S. PATENT DOCUMENTS

| | | | |
|---|---|---|---|
| 5,574,871 A | 11/1996 | Hoyt et al. | |
| 6,108,775 A * | 8/2000 | Shiell | G06F 9/3017 712/233 |
| 7,472,263 B2 | 12/2008 | Yokoi | |
| 7,487,340 B2 | 2/2009 | Luick | |
| 2004/0003176 A1 | 1/2004 | Yokoi et al. | |
| 2004/0003218 A1 | 1/2004 | Ukai | |

FOREIGN PATENT DOCUMENTS

EP      0848323 A2      6/1998

OTHER PUBLICATIONS

International Search Report and Written Opinion—PCT/US2013/059532—ISA/EPO—Jan. 2, 2014.

* cited by examiner

*Primary Examiner* — Zachary K Huson
(74) *Attorney, Agent, or Firm* — Peter Michael Kamarchik; Paul Holdaway (57) ABSTRACT

Swapping branch direction history(ies) in response to a branch prediction table swap instruction(s), and related systems and methods are disclosed. In one embodiment, a branch history management circuit is configured to process a branch prediction table swap instruction. In response to the branch prediction table swap instruction, the branch history management circuit is configured to swap a prior branch direction history set assigned to a current software code region from cache memory, into a branch prediction table (BPT) for use in branch prediction. The current branch direction history set is swapped out of the BPT and stored in cache memory to avoid being overwritten. In this manner, branch direction history sets assigned to particular software code regions are used for branch prediction when processing the particular software code regions. Therefore, branch prediction accuracy and instruction processing throughput of an instruction processing system are increased.

30 Claims, 8 Drawing Sheets

SWAPPING BRANCH DIRECTION HISTORY(IES) IN RESPONSE TO A BRANCH PREDICTION TABLE SWAP INSTRUCTION(S), AND RELATED SYSTEMS AND METHODS

BACKGROUND

I. Field of the Disclosure

The technology of the disclosure relates generally to use of branch direction history to predict resolutions of conditional branches for conditional branch computer instructions in central processing unit (CPU)-based systems.

II. Background

At the heart of the computer platform evolution is the processor. As the physical design of the processor has evolved, methods of processing information and performing functions have also changed. For example, "pipelining" of instructions has been implemented in processor designs. A processor pipeline is composed of many stages, where each stage performs a function associated with executing an instruction. Each stage is referred to as a pipe stage or pipe segment. The stages are connected together to form the pipeline. Instructions enter at one end of the pipeline and exit at the other end. One advantage of pipelining is that the execution of the instructions is overlapped because the instructions are evaluated in parallel. Pipelining is also referred to as instruction level parallelism (ILP).

Figure 1:
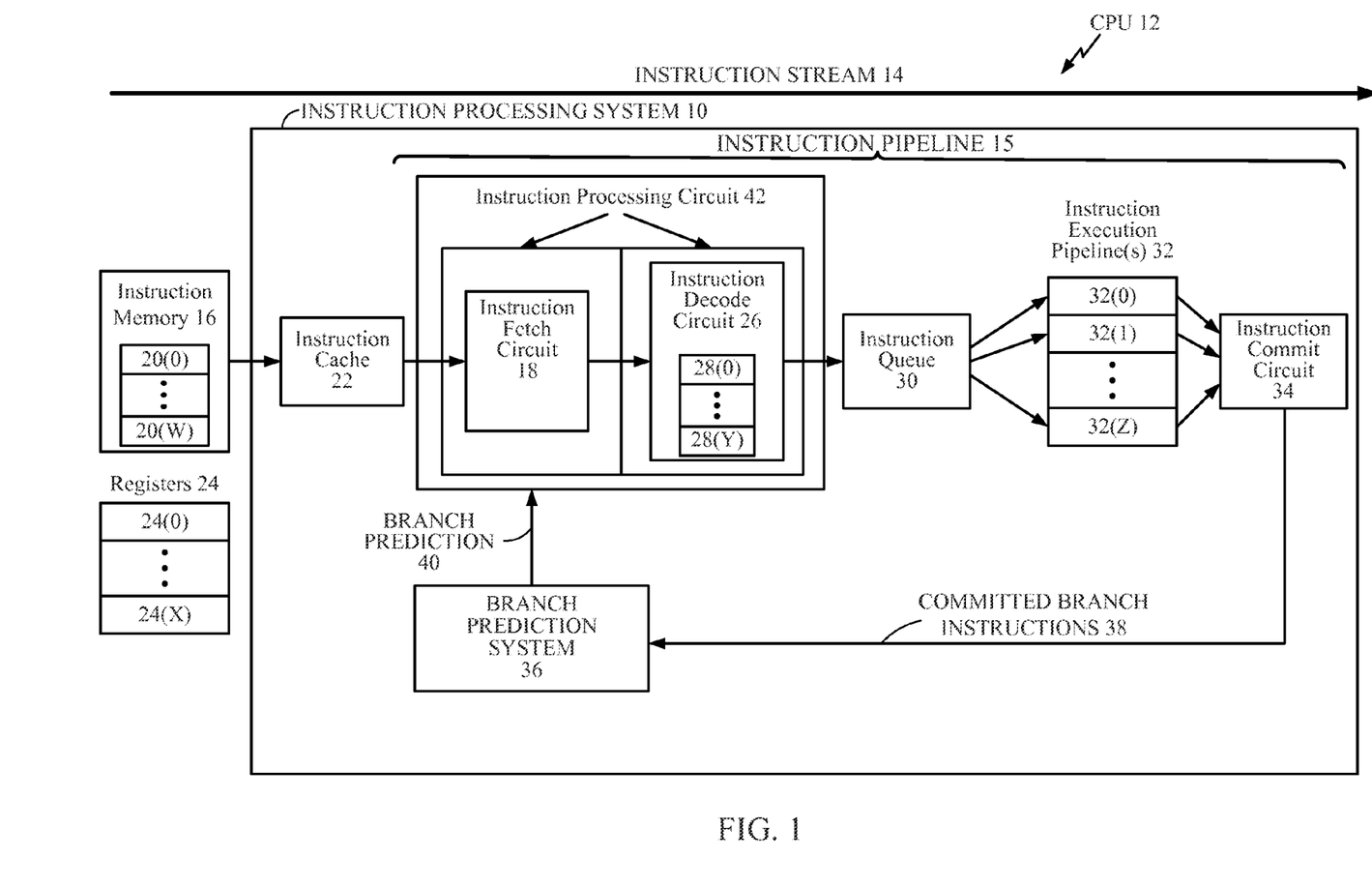
FIG. 1 is a block diagram of an exemplary instruction processing system including a branch prediction system providing a branch prediction for predicting a branch direction of a conditional branch instruction based on previously committed branch instructions.

In this regard, FIG. 1 illustrates an exemplary instruction processing system 10 of a central processing unit (CPU) 12. Instructions are processed in a continuous flow represented by an instruction stream 14 in FIG. 1. The instruction processing system 10 employs an instruction pipeline 15. The instruction pipeline 15 is comprised of a plurality of pipe stages, including instruction fetch, instruction decoding, instruction execution, and instruction commit stages. In the illustrated example, the instruction stream 14 originates from instruction memory 16, which provides storage for instructions of a computer-executable program. An instruction fetch circuit 18 reads an instruction 20 (e.g., instructions 20(0)-20(W)) from the instruction memory 16 and/or from an instruction cache 22, and may increment a program counter, typically stored in one of registers 24(0)-24(X). The registers 24(0)-24(X) are architectural registers of the instruction processing system 10, which may include general purpose registers (GPRs) and/or other architected registers (as non-limiting examples, a frame pointer, a stack pointer, a link register, and/or a program counter).

After an instruction 20 is fetched by the instruction fetch circuit 18, the instruction 20 is decoded by an instruction decode circuit 26. The instruction decode circuit 26 translates the instruction 20 into processor-specific microinstructions, and retrieves operands required by the instruction 20 (if any) from the appropriate one of the registers 24(0)-24(X), or from a data memory (not shown) and/or a data cache (not shown). The instruction decode circuit 26 may hold a set of multiple instructions 28(0)-28(Y) for decoding. The instructions 20 are issued into an instruction queue 30 of instruction execution pipeline(s) 32. Actual execution of the instructions 20 takes place in an instruction execution pipeline 32 (e.g., instruction execution pipelines 32(0)-32(Z)). An instruction commit circuit 34 is provided that determines which of the executed instructions 20 are needed and commits those results, for example by updating the registers 24 (as a non-limiting example, registers 24(0)-24(X)), the data memory, and/or the data cache with the results of the executed instructions 20.

The instructions 20 may include conditional branch instructions. Conditional branch instructions may be taken or not taken. It is not known whether a conditional branch instruction will be taken until the conditional branch instruction is executed and the branch condition is determined. However, instructions beyond a conditional branch instruction may be fetched into the instruction pipeline 15 prior to executing the conditional branch instruction. For example, if a branch is taken, instructions 20 fetched into the instruction pipeline 15 to be executed if the branch were not taken may have to be flushed from the instruction pipeline 15. As a result, instruction processing may be delayed by the number of clock cycle stages in the instruction pipeline 15, to refill the instruction pipeline 15.

To reduce instruction flushing of the instruction pipeline 15, a branch prediction system 36 may be employed in the instruction processing system 10. A branch prediction system 36 predicts the direction of conditional branch instructions. In this regard, the branch prediction system 36 provides a branch prediction 40 predicting the direction of a conditional branch instruction based on a history of committed branch instructions 38. The branch prediction 40 is provided to an instruction processing circuit 42 (as non-limiting examples, the instruction fetch circuit 18 and/or the instruction decode circuit 26) of the instruction processing system 10. Based on the branch prediction 40, the processor may either fetch instructions 20 at the branch target address of the conditional branch instruction into the instruction pipeline 15, or fetch next sequential instructions 20 into the instruction pipeline 15. However, branch predictions provided using conventional methods may not be as accurate as desired.

SUMMARY OF THE DISCLOSURE

Embodiments of the disclosure provide swapping branch direction history(ies) in response to a branch prediction table swap instruction(s), and related systems and methods. A branch prediction table (BPT) is used by a branch prediction system in an instruction processing system to predict the branch direction of conditional branch instructions. Branch prediction is based on a branch direction history set currently loaded in a BPT. The branch direction history set is populated based on resolved branch directions of previously committed branch instructions. Because different software code regions in a CPU may have different branch patterns, branch prediction accuracy may be increased by using different branch direction history sets that are assigned to the different software code regions.

In this regard in one embodiment, a branch history management circuit is provided to manage at least one branch prediction table (BPT) used for branch prediction by a central processing unit (CPU) instruction processing system. The branch history management circuit is configured to respond to execution of a branch prediction table swap instruction. In response to the execution of the branch prediction table swap instruction, the branch history management circuit is configured to swap a current branch direction history set used for branch prediction in at least one branch prediction table (BPT) with one of a plurality of prior branch direction history sets stored in a cache. The term "prior branch direction history set" means a branch direction history set present in a BPT prior to performing to performing a branch direction history set swap, regardless of whether the prior branch direction history set has yet been used for branch prediction. In this manner, branch predictions may be more accurate. As a result, instruction processing throughput of an instruction processing system may be increased due to reduced instruction pipeline flushing and/or reduced numbers of bubbles being introduced into the instruction pipeline.

As non-limiting examples, the branch prediction table swap instruction allows a programmer and/or compiler to control which code region(s) is associated with a branch direction history set for use by the branch prediction system. The programmer and/or compiler may make these selections based on the programmer's and/or compiler's knowledge, analysis, and/or profiling of the code. Thus, branch prediction accuracy may be increased under the programmer's and/or compiler's control.

In another embodiment, a means for providing branch history management to manage at least one branch prediction table (BPT) used for branch prediction by a central processing unit (CPU) instruction processing system is disclosed. The means for providing branch history management comprises means responsive to execution of a branch prediction table swap instruction. In response to the execution of the branch prediction table swap instruction, the means is configured to swap a current branch direction history set used for branch prediction in at least one branch prediction table (BPT) with one of a plurality of prior branch direction history sets stored in a cache.

In another embodiment, a method of operating a branch history management circuit for managing at least one branch prediction table (BPT) used for branch prediction by a central processing unit (CPU) instruction processing system is disclosed. The method is responsive to execution of a branch prediction table swap instruction. In response to the execution of the branch prediction table swap instruction, the method comprises swapping a current branch direction history set used for branch prediction in at least one branch prediction table (BPT) with one of a plurality of prior branch direction history sets stored in a cache.

In another embodiment, a cache is disclosed. The cache is configured to store a plurality of prior branch direction history sets. The cache is responsive to execution of a branch prediction table swap instruction. In response to the execution of the branch prediction table swap instruction, the cache is configured to provide one of the plurality of prior branch direction history sets into a branch prediction table (BPT) to be used as a current branch direction history by a branch prediction circuit in a central processing unit (CPU). The cache is also configured to store an evicted branch direction history set evicted from the BPT to one of the plurality of prior branch direction history sets.

In another embodiment, a branch prediction system for performing branch prediction in a central processing unit (CPU) instruction processing system is disclosed. The branch prediction system comprises a cache. The cache is configured to store a plurality of prior branch direction history sets. The cache is responsive to execution of a branch prediction table swap instruction. In response to the execution of the branch prediction table swap instruction, the cache is configured to provide one of the plurality of prior branch direction history sets into a branch prediction table (BPT) to be used as a current branch direction history by a branch prediction circuit in a central processing unit (CPU). The cache is further configured to store an evicted branch direction history set evicted from the BPT to one of the plurality of prior branch direction history sets. The branch prediction system also comprises a branch history management circuit. The branch history management circuit is configured to respond to the execution of the branch prediction table swap instruction. In response to the execution of the branch prediction table swap instruction, the branch history management circuit is configured to swap a current branch direction history set used for branch prediction in at least one BPT with the one of the plurality of prior branch direction history sets stored in the cache.

In another embodiment, a non-transitory computer-readable medium is disclosed. The computer-readable medium has stored thereon computer-executable instructions. The instructions comprise at least one branch prediction table swap instruction. The instructions cause a processor to implement a method of operating a branch history management circuit. The instructions comprise, in response to execution of a branch prediction table swap instruction, swapping a current branch direction history set used for branch prediction in at least one branch prediction table (BPT) with one of a plurality of prior branch direction history sets stored in a cache.

DETAILED DESCRIPTION

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments of the disclosure provide swapping branch direction history(ies) in response to a branch prediction table swap instruction(s), and related systems and methods. A branch prediction table (BPT) is used by a branch prediction system in an instruction processing system to predict the branch direction of conditional branch instructions. Branch prediction is based on a branch direction history set currently loaded in a BPT. The branch direction history set is populated based on resolved branch directions of previously committed branch instructions. Because different software code regions in a CPU may have different branch patterns, branch prediction accuracy may be increased by using different branch direction history sets that are assigned to the different software code regions.

In this regard in one embodiment, a branch history management circuit for managing at least one branch prediction table (BPT) used for branch prediction by a central processing unit (CPU) instruction processing system is disclosed. The branch history management circuit is configured to respond to execution of a branch prediction table swap instruction. In response to the execution of the branch prediction table swap instruction, the branch history management circuit is configured to swap a current branch direction history set used for branch prediction in at least one branch prediction table (BPT) with one of a plurality of prior branch direction history sets stored in a cache. In this manner, branch predictions may be more accurate. As a result, instruction processing throughput of an instruction processing system may be increased due to reduced instruction pipeline flushing and/or reduced numbers of bubbles being introduced into the instruction pipeline.

In this regard, as non-limiting examples, the branch prediction table swap instruction allows a programmer and/or compiler to control which software code region(s) is associated with a branch direction history set for use by the branch prediction system. The programmer and/or compiler may make these selections based on the programmer's and/or compiler's knowledge, analysis, and/or profiling of the code. Thus, branch prediction accuracy may be increased under the programmer's and/or compiler's control.

Figure 2:
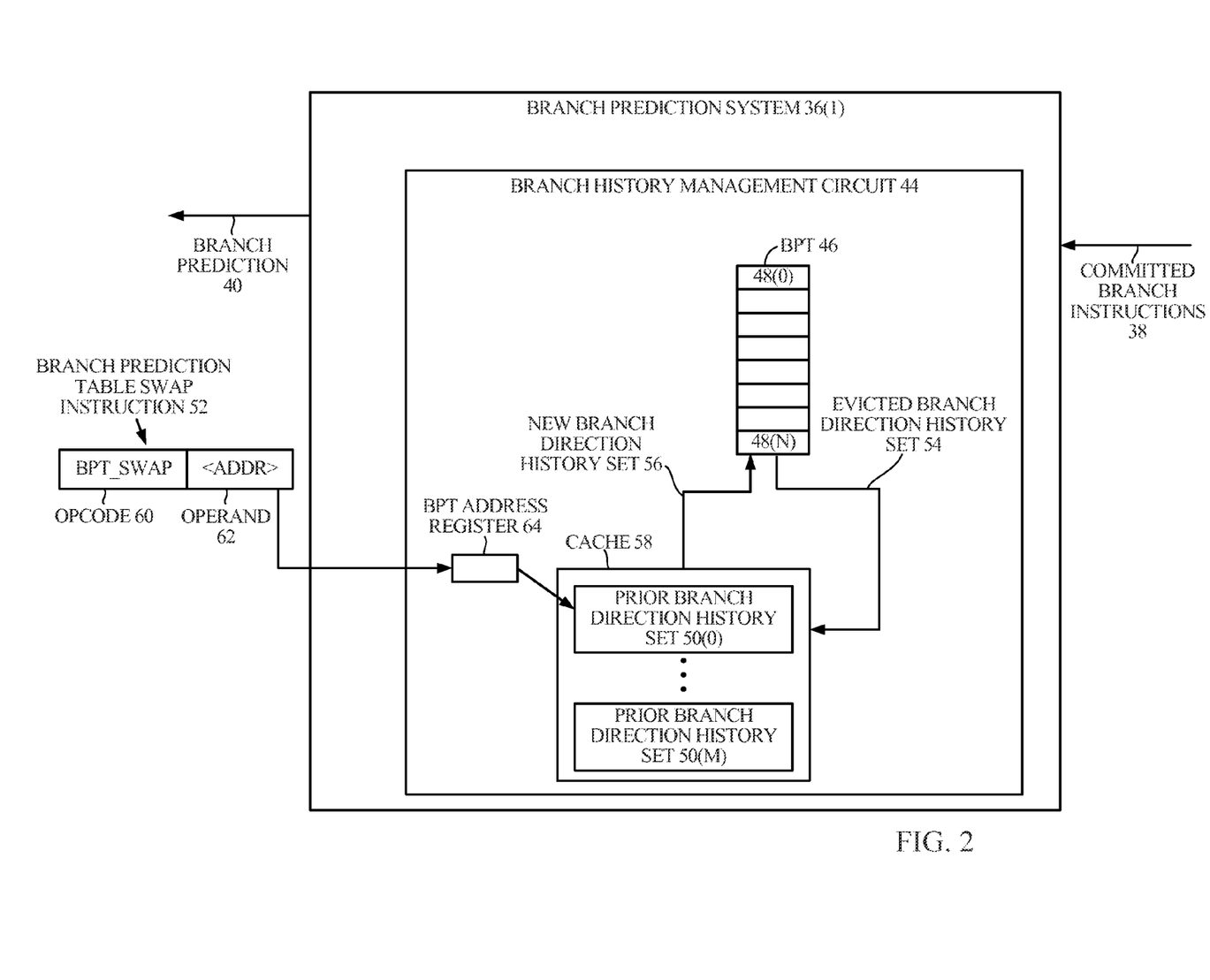
FIG. 2 is a block diagram of an exemplary branch prediction system employing a branch history management circuit configured to swap a branch direction history(ies) in a branch prediction table (BPT) in response to a branch prediction table swap instruction(s)

In this regard, FIG. 2 illustrates an alternative branch prediction system 36(1) that includes circuitry configured to swap a branch direction history set in a branch prediction table in response to a branch prediction table swap instruction. More specifically, a branch history management circuit 44 is provided in the branch prediction system 36(1). The branch history management circuit 44 is configured to swap a branch direction history set among BPT entries 48 in a BPT 46 in response to a branch prediction table swap instruction 52. The branch history management circuit 44 maintains information based on previously committed branch instructions 38 that may be used to predict the direction to which a newly fetched conditional branch instruction will resolve.

In this regard, with continuing reference to FIG. 2, the branch history management circuit 44 employs the BPT 46. The BPT 46 comprises a plurality of BPT entries 48 (e.g., BPT entries 48(0)-48(N)). Each BPT entry 48 stores information indicating whether one or more prior executions of a conditional branch instruction(s) were taken or not taken. Thus, each BPT entry 48 may be used to provide a branch prediction 40 indicating whether a branch of a newly fetched conditional branch instruction(s) will more likely be taken or not taken. As a non-limiting example, each BPT entry 48 may comprise a saturating counter. The saturating counter may be incremented when a conditional branch instruction indexing to the BPT entry 48 resolves as taken, and decremented when not taken. As a result, the highest order bit of the saturating counter may be used to predict whether the conditional branch instruction will be taken (1) or not taken (0).

In this embodiment, a smaller-sized BPT 46 may be employed to reduce memory size requirements for the BPT 46 and to conserve power in maintaining memory state. However, a smaller-sized BPT 46 may not be capable of providing a BPT entry 48 for each unique branch condition to be resolved. For example, the BPT 46 may be indexed based on the memory address of a conditional branch instruction. As a result, BPT entries 48 may be aliased, because two or more different conditional branch instructions may index to a same BPT entry 48 of the BPT 46. Aliasing of a BPT entry 48 in the BPT 46 may reduce accuracy of branch predictions 40 based on the BPT entry 48, because histories of the two or more different conditional branch instructions are used to update the same BPT entry 48. As an alternative to indexing a BPT 46 based on the memory address of a conditional branch instruction, a BPT 46 may be indexed based on a pattern of directions to which recently committed branch instructions 38 have resolved, referred to as a "branch pattern history," or "pattern history." A BPT 46 indexed by branch pattern history may also be referred to as a pattern history table (PHT). Indexing the BPT 46 based on branch pattern history may be advantageous, because a current conditional branch instruction executing after a certain pattern history may be more likely to resolve in the same direction as a prior conditional branch instruction executing after the same pattern history.

However, different software code regions of the instructions 20 may resolve particular pattern histories differently. Different software code regions may be provided in different software applications, processes, threads, libraries, or subroutines, as non-limiting examples. Furthermore, the instruction processing system 10 may switch execution among the different software code regions, due to context switching, subroutine calls, and/or subroutine returns. When execution switches to a software code region that resolves a pattern history differently, accuracy of branch predictions 40 is initially reduced. This occurs because the branch predictions 40 are based on aliased BPT entries 48 updated to predict branch directions 40 based on a different software code region. The accuracy of the branch predictions 40 may improve as the aliased BPT entries 48 are updated based on the current software code region. However, when execution again switches to another software code region, the accuracy of the branch predictions 40 may again be reduced.

Thus, in embodiments disclosed herein, the accuracy of branch predictions 40 is increased by swapping in and out different branch direction history sets for different software code regions of instructions 20 in and out of the BPT 46 based on a branch prediction table swap instruction. In response to a branch prediction table swap instruction, a branch direction history set for a current software code region being processed in the instruction pipeline is loaded into the BPT 46 for performing branch predictions 40 for conditional branch instructions in that current software code region. As a result of executing and resolving conditional branch instructions in the current software code region, the corresponding branch direction history set loaded in the BPT 46 is updated based on the resolutions of conditional branch instructions executed in the current software code region.

When a different software code region is processed in the instruction pipeline, as indicated by a subsequent branch prediction table swap instruction, the current branch direction history set is evicted from the BPT 46 into cache memory so as to not be overwritten by resolutions of conditional branch instructions in the different software code region. A different branch direction history set assigned to the different software code region is loaded from cache into the BPT 46 to become the new (i.e., current) branch direction history set. The evicted branch direction history set can be loaded back into the BPT 46 when the software code region assigned to the evicted branch direction history set is once again processed in the instruction pipeline in the future. Thus, the branch predictions 40 performed by the BPT 46 will be more accurate by use of branch direction history sets assigned to particular software code regions that maintain the branch direction history sets for those particular software code regions. As a result of this increased branch prediction accuracy, instruction processing throughput of an instruction processing system employing the branch history management circuit 44 may be increased.

With continuing reference to FIG. 2, the branch history management circuit 44 employs a cache 58 configured to store a plurality of prior branch direction history sets 50 (as non-limiting examples, prior branch direction history sets 50(0)-50(M), each associated with a different software code region. As used herein, a "prior branch direction history" is comprised of information indicating whether at least one particular branch instruction and/or at least one particular branch instruction pattern has been more often taken or not taken. A "prior branch direction history set" comprises a set of prior branch direction histories (e.g., a set of saturating counters). The term "prior branch direction history set 50" means a branch direction history set present in a BPT entry 48 in the BPT 46 prior to performing to performing a branch direction history set swap, regardless of whether the prior branch direction history set has yet been used for branch prediction.

The cache 58 may be any of various types of caches. As non-limiting examples, the cache 58 may comprise a data cache, a level one data cache, a level two data cache, a multi-level data cache and/or a prior branch direction history set cache. For example, the cache 58 may be a data cache storing other data of the instruction processing system 10 of FIG. 1. Alternatively, the cache 58 may be configured to only store branch prediction information. For example, the cache 58 may be a specialized cache configured to only store the plurality of prior branch direction history sets 50, and/or other branch prediction information. The cache 58 may be provided on a same semiconductor die as the branch history management circuit 44. Alternatively, the cache 58 may be provided as a separate cache (for example, on a different semiconductor die than the branch history management circuit 44).

Figure 3:
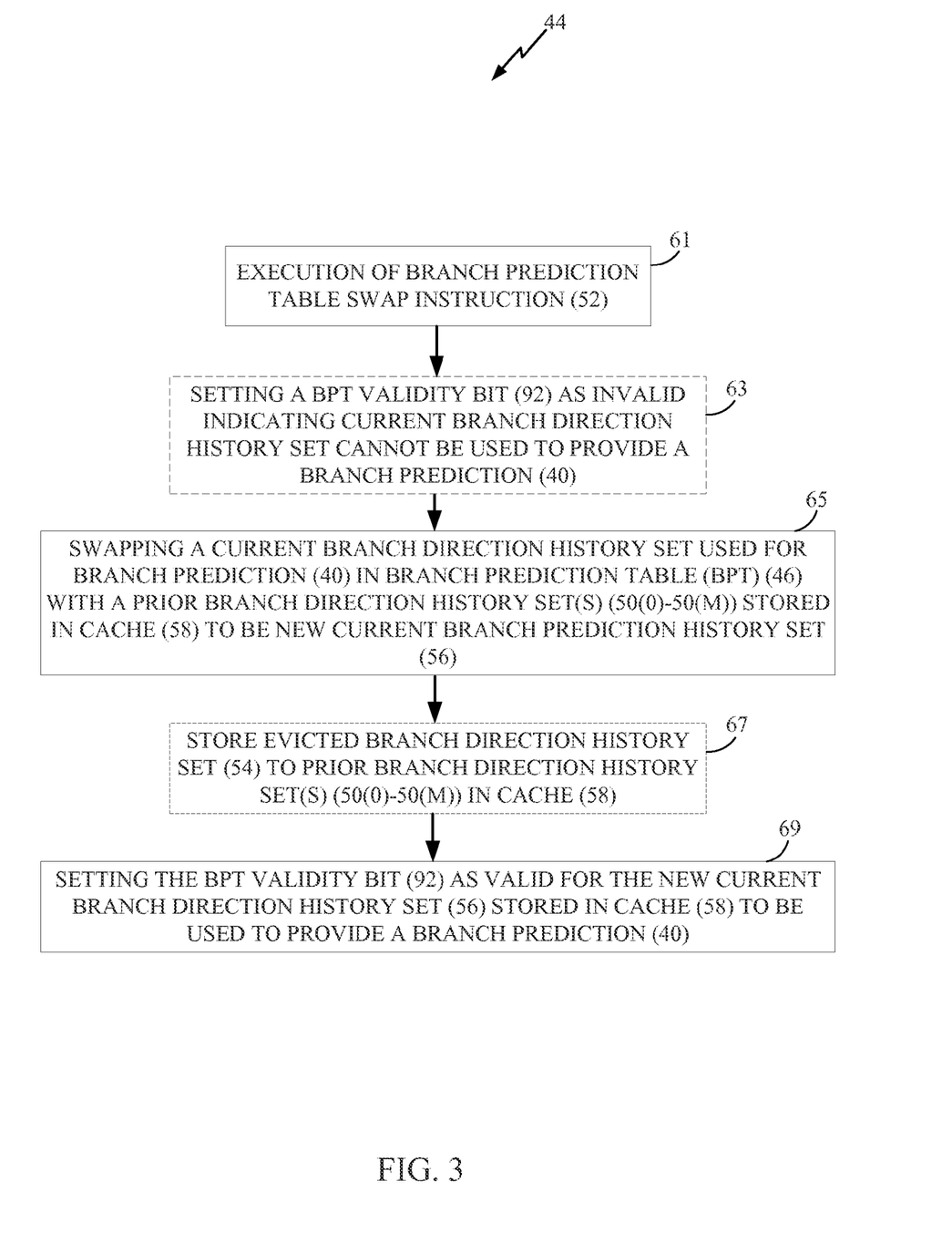
FIG. 3 is a flowchart illustrating an exemplary process of the branch prediction system in FIG. 2 employing a branch history management circuit configured to swap a branch direction history(ies) in a branch prediction table (BPT) in response to a branch prediction table swap instruction(s)

With continuing reference to FIG. 2 and the flowchart in FIG. 3, the branch history management circuit 44 is configured to respond to execution of a branch prediction table swap instruction 52 (block 61 in FIG. 3). In response to the execution of the branch prediction table swap instruction 52, the branch history management circuit 44 is configured to swap a current branch direction history set (e.g., contents of BPT entries 48(0)-48(N)) used for branch prediction 40 in the BPT 46 with one of a plurality of prior branch direction history sets 50(0)-50(M) into the BPT 46 (e.g., new branch direction history set 56) (block 65 in FIG. 3).

In this regard, the branch prediction table swap instruction 52 may comprise an operand 62 indicating which prior branch direction history set 50 among the plurality of prior branch direction history sets 50(0)-50(M) in the cache 58 will be swapped into the BPT 46. The operand 62 may comprise an address and/or index of the prior branch direction history set 50 to swap into the BPT 46. In response to receipt of an indication that the branch prediction table swap instruction 52 has executed and/or committed, the branch history management circuit 44 may evict the current branch direction history set (e.g., contents of BPT entries 48(0)-48(N)) from the BPT 46. The branch history management circuit 44 may also load one of the plurality of prior branch direction history sets 50 into the BPT 46 as the new branch direction history set 56. The branch history management circuit 44 may also optionally store the evicted branch direction history set 54 to one of the plurality of prior branch direction history sets 50 (block 67 in FIG. 3).

Figure 6:
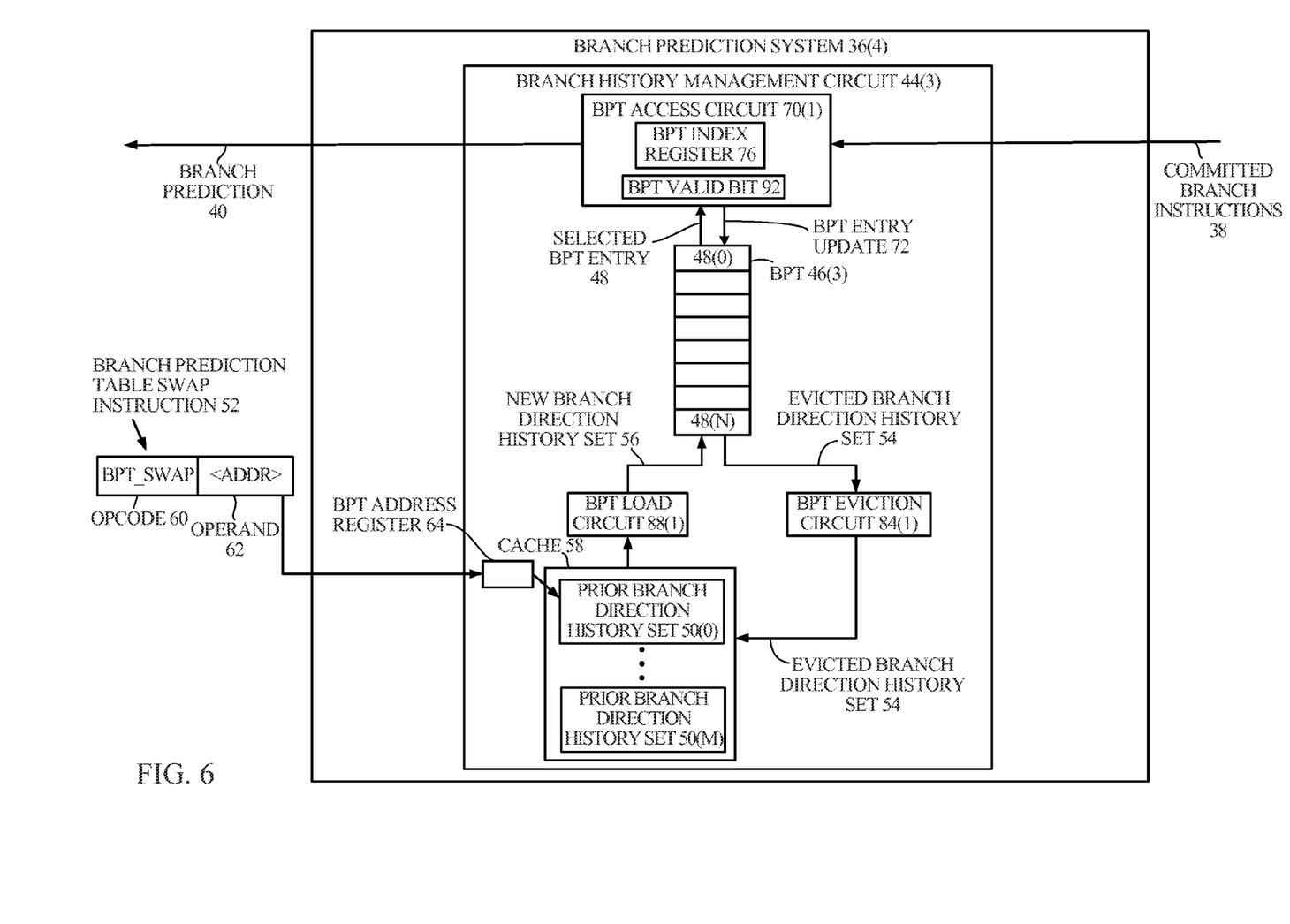
FIG. 6 is a block diagram of an alternative branch prediction system employing a branch history management circuit configured to swap a branch direction history(ies) in a branch prediction table (BPT) in response to a branch prediction table swap instruction(s), which employs a BPT validity indicator indicating whether the BPT is valid for use in branch prediction.

With continuing reference to FIG. 3, as will be discussed below in more detail with regard to FIG. 6, the branch history management circuit 44 may optionally be configured to set the current branch direction history set stored in the BPT 46 prior to the swap as invalid for branch prediction 40 (block 63 in FIG. 3). This prevents the branch history management circuit 44 from using the current branch direction history set stored in the BPT 46 for branch prediction 40 during the swap (block 63 in FIG. 3). The branch history management circuit 44 may then be configured to set the new current branch direction history set 56 stored in the BPT 46 as valid for branch prediction 40 after the branch direction history set swap is performed (block 69 in FIG. 3). This is so that the branch history management circuit 44 can use the new current branch direction history set 56 stored in the BPT 46 for branch prediction 40 after the branch direction history set swap is performed.

A particular software code region may be associated with a certain prior branch direction history set 50 in the cache 58. In order to maintain the association, the evicted branch direction history set 54 may be stored in the same entry of the cache 58 (e.g., at the same cache address and/or same cache index) from which it was loaded. In this regard, the branch history management circuit 44 may further comprise a BPT address register 64 for storing the address and/or index of the prior branch direction history set 50 most recently swapped into the BPT 46. When beginning the swap, the evicted branch direction history set 54 may be written to the prior branch direction history set 50 indicated by the BPT address register 64. Thereafter, the BPT address register 64 may be set to the address or index indicated by the operand 62 of the branch prediction table swap instruction 52. In this manner, the evicted branch direction history set 54 may be stored into the prior branch direction history set 50 from which that branch direction history set was previously loaded. As a result, the prior branch direction history set 50 for a particular software code region is updated based on the evicted branch direction history set 54 for that software code region. In this manner, branch prediction accuracy is increased.

The branch prediction table swap instruction 52 may be provided as any of a variety of types of instructions. In this regard, the branch prediction table swap instruction 52 may comprise a machine code instruction, an object code instruction, an assembly language instruction, a C language instruction, and/or a higher-level language instruction (as non-limiting examples, a C++ instruction, a Smalltalk instruction, and/or a JAVA instruction). As illustrated in FIG. 2, the branch prediction table swap instruction 52 may comprise an operation code 60 (also referred to as an "opcode"), such as "BPT_SWAP." However, alternative syntax may also be used to represent the operation code 60 of the branch prediction table swap instruction 52. The branch prediction table swap instruction 52 may be an atomic instruction of the instruction processing system 10. The branch prediction table swap instruction 52 may execute during one or more clock cycles of the instruction processing system 10.

There are several advantages to providing a branch prediction table swap instruction 52 to trigger the swapping of a current branch direction history set used by a BPT 46 for branch prediction. A branch prediction table swap instruction 52 enables a software programmer and/or compiler to select which software code regions to assign to a prior branch direction history set 50 in the cache 58. The programmer and/or compiler may make such selections based on knowledge, analysis, and/or profiling of the software that will run on the instruction processing system 10. In this manner, the accuracy of the branch predictions 40 may be increased. The programmer and/or compiler may also place the invocations of the branch prediction table swap instructions 52 so that there are not too few prior branch direction history sets 50, which may result in branch predictions 40 having decreased accuracy due to excessive aliasing. The programmer and/or compiler may also place the invocations of the branch prediction table swap instructions 52 so that there are not too many prior branch direction history sets 50, which may cause an excessive cache memory size of the cache 58. In this manner, the accuracy of the branch predictions 40 may be increased.

As discussed herein, swapping different prior branch direction history sets 50 into the BPT 46 for different software code regions may increase the branch prediction accuracy of the BPT 46. The increased branch prediction accuracy may be traded off for a reduced-size BPT 46. Reducing the number of BPT entries 48 in a BPT 46 increases the amount of aliasing, and thus decreases the accuracy of the BPT 46. Thus, the size of a BPT 46 may be reduced such that the amount of accuracy gained from using different prior branch direction history sets 50 exceeds or is substantially equal to the amount of accuracy lost due to the decreased size of the BPT 46. In this manner, a reduced-size BPT 46 responsive to the branch prediction table swap instruction 52 may be employed which maintains or exceeds the accuracy of a larger-sized BPT used for all branch predictions.

Figure 4:
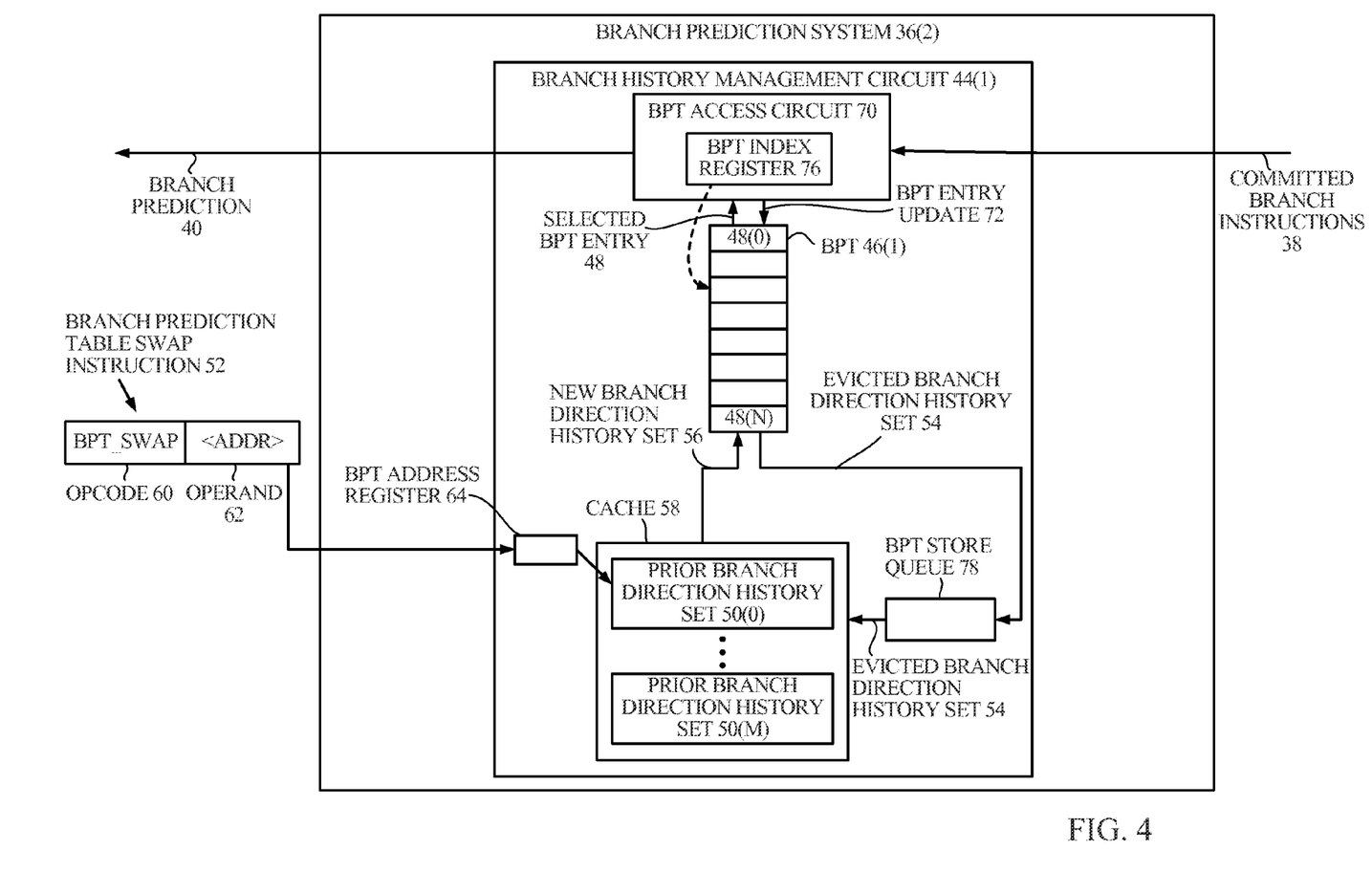
FIG. 4 is a block diagram of the branch prediction system of FIG. 2, further employing a queue for queuing evicted branch direction history sets for storage into a cache.

Referring now to FIG. 4, an intermediate queue may be employed to store the evicted branch direction history set 54. As a result, the new branch direction history set 56 can be loaded into the BPT 46(1) before the evicted branch direction history set 54 is stored in the cache 58. In this manner, the amount of time required for swapping the prior branch direction history set 50 in the BPT 46(1) may be reduced. In this regard, a branch history management circuit 44(1) of a branch prediction system 36(2) employs a BPT store queue 78. The BPT store queue 78 is configured to receive and store an evicted current branch direction history set(s) 54 from the BPT 46(1) until the evicted branch direction history set(s) 54 are stored into the cache 58.

The current value of the BPT address register 64 may also be stored in the BPT store queue 78 along with the evicted branch direction history set 54 from the BPT 46(1). Thereafter, the evicted branch direction history set 54 may be stored in the cache 58 at the address (or index) indicated by the queued value of the BPT address register 64. In this manner, the branch history management circuit 44(1) may determine which prior branch direction history set 50 to use to store the evicted branch direction history set 54 from the BPT 46(1). Thereafter, the prior branch direction history set 50 is swapped into the BPT 46(1), and the BPT address register 64 is set to the address (or index) of the prior branch direction history set 50 being swapped into the BPT 46(1). In this manner, the evicted branch direction history set 54 can be stored into the prior branch direction history set 50 from which that branch direction history set was previously loaded.

With continuing reference to FIG. 4, the branch history management circuit 44(1) may further comprise a BPT access circuit 70. The BPT access circuit 70 is configured to receive committed branch instructions 38 from the instruction processing system 10. The BPT access circuit 70 is further configured to update the BPT entries 48 of the BET 46(1) based on the directions (e.g., taken or not taken) of the committed branch instructions 38 (BPT entry update 72). In this regard, the BPT access circuit 70 may increment and/or decrement saturating counters of the BPT entries 48(0)-48(N) based on the committed branch instructions 38. The BPT access circuit 70 is also configured to provide a branch prediction 40 predicting whether a branch of a conditional branch instruction will be taken or not taken. As a non-limiting example, the branch prediction 40 may be made based on the highest order bit (i.e. the most significant bit) of a saturating counter of the BET entry 48. A BPT index register 76 of the BPT access circuit 70 may be used to store an index of the currently selected BPT entry 48 of the BPT 46(1). Like elements having like element numbers are not redescribed.

Figure 5:
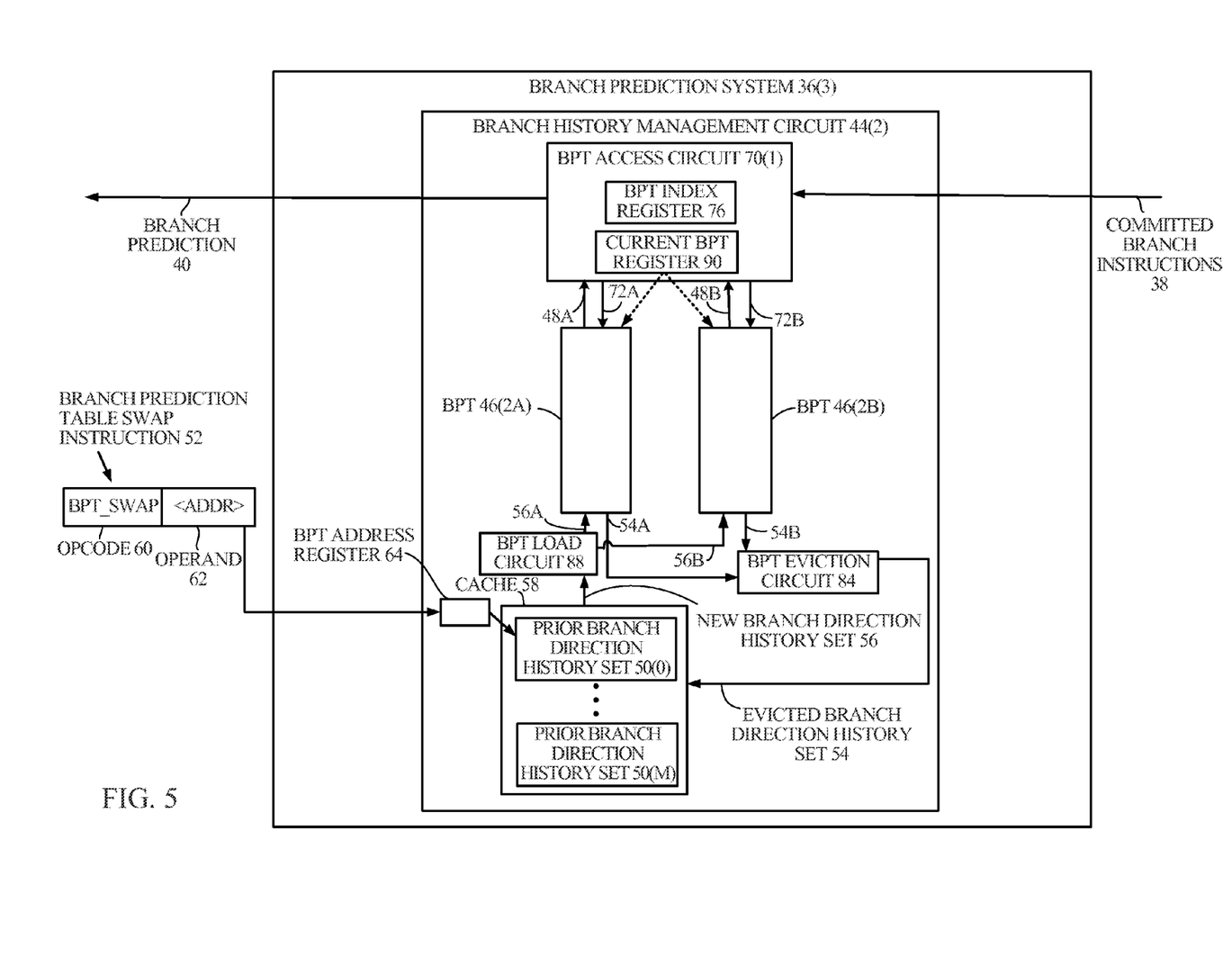
FIG. 5 is a block diagram of an alternative branch prediction system employing a branch history management circuit configured to swap a branch direction history(ies) in a branch prediction table (BPT) in response to a branch prediction table swap instruction(s), which employs an active BPT and a shadow BPT.

Referring now to FIG. 5, in order to continue to provide branch predictions 40 from a BPT 46 while anew branch direction history set 56 is being loaded, an active BPT and a shadow BPT may be employed. In this regard, FIG. 5 illustrates a branch history management circuit 44(2) of a branch prediction system 36(3) employing an active BPT, and a shadow BPT which may be switched to become the active BPT. The branch history management circuit 44(2) also employs a current BPT register 90 indicating which of the BPTs 46 (as non-limiting examples, BPT 46(2A) and BPT 46(2B)) is the active BPT. Employing both an active BPT and a shadow BPT is advantageous, because the shadow BPT may be concurrently loaded with a prior branch direction history set 50 while the active BPT remains active. Thus, while the shadow BPT is being loaded, the BPT access circuit 70(1) may continue to provide branch predictions 40 based on selected BPT entries 48 (as non-limiting examples, selected BPT entries 48A, 48B) from the active BPT. In addition, received committed branch instructions 38 may continue to be used to update the corresponding BPT entries 48 of the active BPT (as non-limiting examples, via BPT entry updates 72A, 72B). In this manner, the active BPT may continue to be used for branch prediction 40 and BPT entry updates 72 while a prior branch direction history set 50 is being loaded, even if a longer period of time is required to load new branch direction history 56 from the cache 58.

As a non-limiting example, assume that the BPT 46(2A) is the active BPT, and that BPT 46(2B) is the shadow BPT. Upon receiving a committed branch instruction 38, the BPT access circuit 70(1) updates a BPT entry 48 of the currently active BPT (BPT 46(2A)) (BPT entry update 72A). For branch prediction, the BPT access circuit 70(1) provides a branch prediction 40 based on a currently selected BPT entry 48 from the active BPT (BPT 46(2A)) (selected BPT entry 48A). In response to a branch prediction table swap instruction 52, a BPT load circuit 88 loads anew branch direction history set 56 from the cache 58 into the shadow BPT (BPT 46(2B)) (new branch direction history set 56B). Upon completion of the loading of the prior branch direction history set 50 into the shadow BPT (BPT 46(2B)), the current BPT register 90 is set to change the shadow BPT (BPT 46(2B)) to be the active BPT. Thereafter, a BPT eviction circuit 84 evicts the branch direction history (evicted branch direction history set 54A) from the previously active BPT (BPT 46(2A)), which is now the shadow BPT.

Now, upon receiving a committed branch instruction 38, the BPT access circuit 70(1) updates a BPT entry 48 of the currently active BPT (BPT 46(2B)) (BPT entry update 72B). For branch prediction, the BPT access circuit 70(1) provides a branch prediction 40 based on a selected BPT entry 48 from the active BPT (BPT 46(2B)) (selected BPT entry 48B). In response to another branch prediction table swap instruction 52, the BPT load circuit 88 loads a new branch direction history set 56 from the cache 58 into the shadow BPT (BPT 46(2A)) (new branch direction history set 56A). Upon completion of the loading of the new branch direction history set 56A into the shadow BPT (BPT 46(2A)), the current BPT register 90 is set to change the shadow BPT (BPT 46(2A)) to be the active BPT. Thereafter, the BPT eviction circuit 84 evicts the branch direction history (evicted branch direction history set 54B) from the previously active BPT (BPT 46(2B)), which is once again the shadow BPT. In this manner, branch predictions 40 may continue to be provided from a BPT 46 while a new branch direction history set 56 is being loaded from the cache 58.

In a memory-constrained instruction processing system 10, it may be desirable to employ a branch history management circuit 44 utilizing fewer memory cells than are required when employing both an active BPT and a shadow BPT. In this regard, FIG. 6 illustrates a branch history management circuit 44(3) of a branch prediction system 36(4) employing a single BPT 46(3). However, in response to a branch prediction table swap instruction 52, it may not be desirable to use the BPT 46(3) for branch predictions 40 until the loading of the new branch direction history set 56 into the BPT 46(3) has completed. In this regard, the branch history management circuit 44(3) employs a BPT valid hit 92 indicating whether the BPT 46(3) may currently be used to provide a branch prediction 40. The BPT valid bit 92 may be set to invalid in response to the execution of the branch prediction table swap instruction 52. The BPT valid bit 92 may thereafter be set to valid in response to the completion of the loading of the new branch direction history set 56 into the BPT 46(3). Thus, branch predictions 40 may only be provided based on the BPT 46(3) if the BPT valid bit 92 is valid. This avoids providing a branch prediction 40 based on an invalid BPT entry 48.

If the BPT valid bit 92 indicates that the BPT 46(3) is invalid, then a default rule may be used to predict the branch direction of the conditional branch instruction. As a non-limiting example, the default rule may be a backward taken, forward not-taken (BTFNT) rule. The BTFNT rule predicts that a conditional branch will be taken if the target address of the conditional branch instruction is less than the address of the conditional branch instruction (backwards taken). Otherwise, the BTFNT rule predicts that the conditional branch will not be taken (forwards not-taken). The BTFNT rule is advantageous for looping instructions because a looping instruction (as non-limiting examples, a WHILE loop, a FOR loop, a DO loop, a DO UNTIL loop, a REPEAT UNTIL loop, etc.) is generally more likely to branch back to an earlier portion of the loop before exiting the loop. By applying the default rule for branch prediction when the BPT 46(3) is not valid, and applying the dynamically-obtained BPT entry 48 from the BPT 46(3) for branch prediction while the BPT 46(3) is valid, branch predictions 40 may continue to be provided even while a single BPT 46(3) is being loaded from the cache 58.

Figure 7:
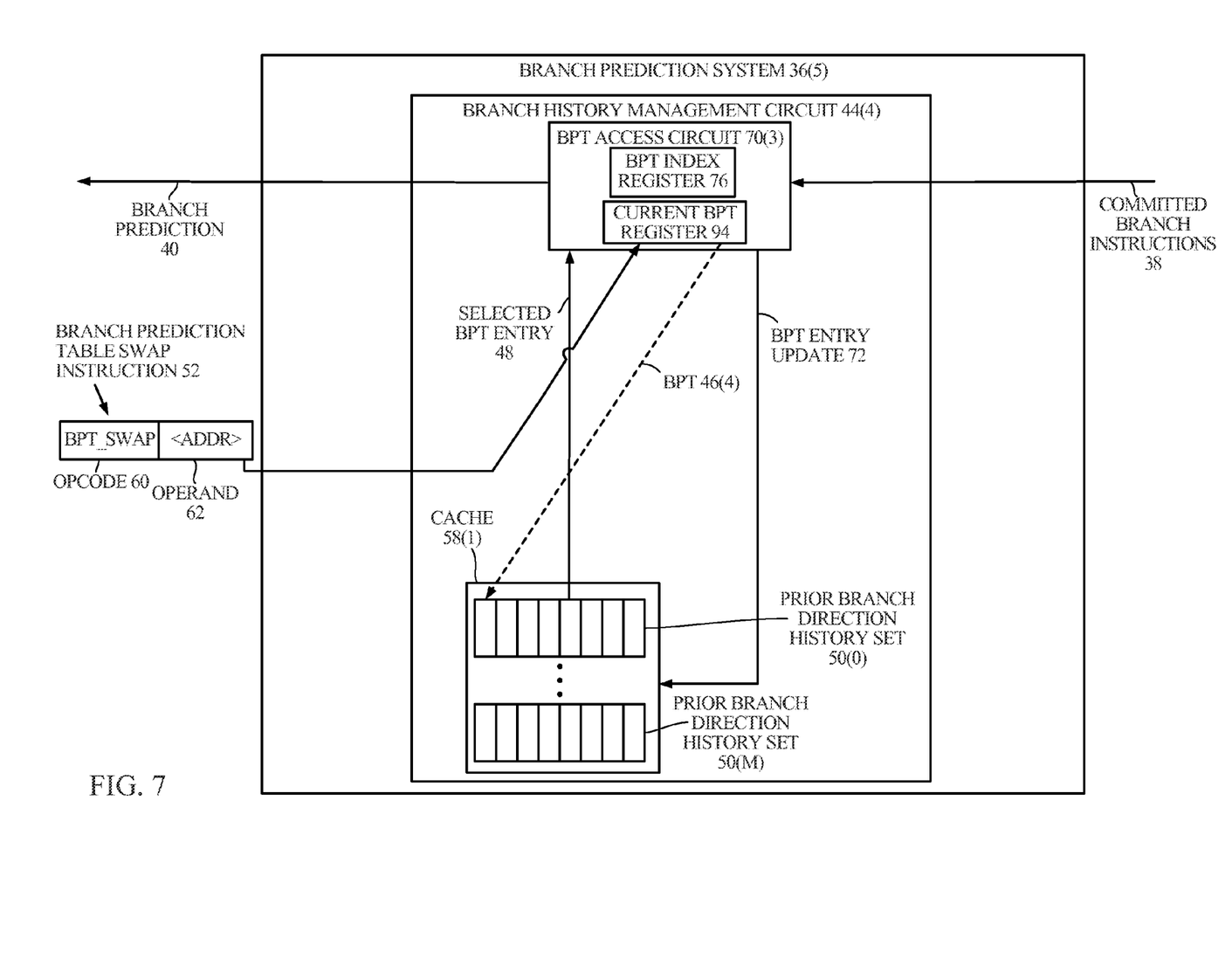
FIG. 7 is a block diagram of an alternative branch prediction system employing a branch history management circuit configured to swap a branch direction history(ies) in a branch prediction table (BPT) in response to a branch prediction table swap instruction(s), that selects a current BPT from a plurality of BPTs in a cache, and directly accesses and updates the current BPT directly in the cache.

Referring now to FIG. 7, it may be desirable to employ additional memory for the BPT(s) 46 in order to reduce the amount of time required to swap a branch direction history set used for branch prediction in response to a branch prediction table swap instruction(s) 52. In this regard, FIG. 7 illustrates a branch history management circuit 44(4) of a branch prediction system 36(5) employing a cache 58(1) having prior branch direction history sets 50(0)-50(M) that may be directly accessed as an active BPT 46(4). The branch history management circuit 44(4) swaps a current branch direction history set used for branch prediction 40 by switching which prior branch direction history 50 in the cache 58(1) is used as the active BPT 46(4). In this regard, a current BPT register 94 is employed to indicate which prior branch direction history set 50 in the cache 58(1) should be directly accessed as the active BPT 46(4). Upon execution of the branch prediction table swap instruction 52, the branch history management circuit 44(4) receives and stores the value of the address operand 62 of the branch prediction table swap instruction 52 into the current BPT register 94 to select the currently active BPT in the cache 58(1). Then, the BPT access circuit 70(3) directly accesses the selected prior branch direction history set 50 in the cache 58(1) as the active BPT 46(4). In this manner, the prior branch direction history sets 50 do not have to be evicted from and/or loaded to the cache 58(1) in order to swap the branch direction history set used for branch prediction. As a result, the amount of time required for swapping a branch direction history set used for branch prediction is reduced.

Any of the embodiments described herein may further comprise additional components and/or be subject to further variation. As a non-limiting example, the branch prediction systems 36 described herein may further comprise a branch target cache to provide the instruction processing system the ability to recognize whether a newly fetched instruction is or is not a conditional branch instruction, in advance of the instruction being decoded. The branch target cache may be implemented as a branch target address cache (BTAC) and/or a branch target instruction cache (BTIC). When implemented as a BTIC, the BTIC additionally caches branch target instructions of conditional branch instructions.

The instruction processing systems, branch prediction systems, and/or branch history management circuits for swapping a branch direction history(ies) in a BPT in response to a branch prediction table swap instruction(s), according to embodiments disclosed herein, may be provided in or integrated into any processor-based device, or into a semiconductor die. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 8:
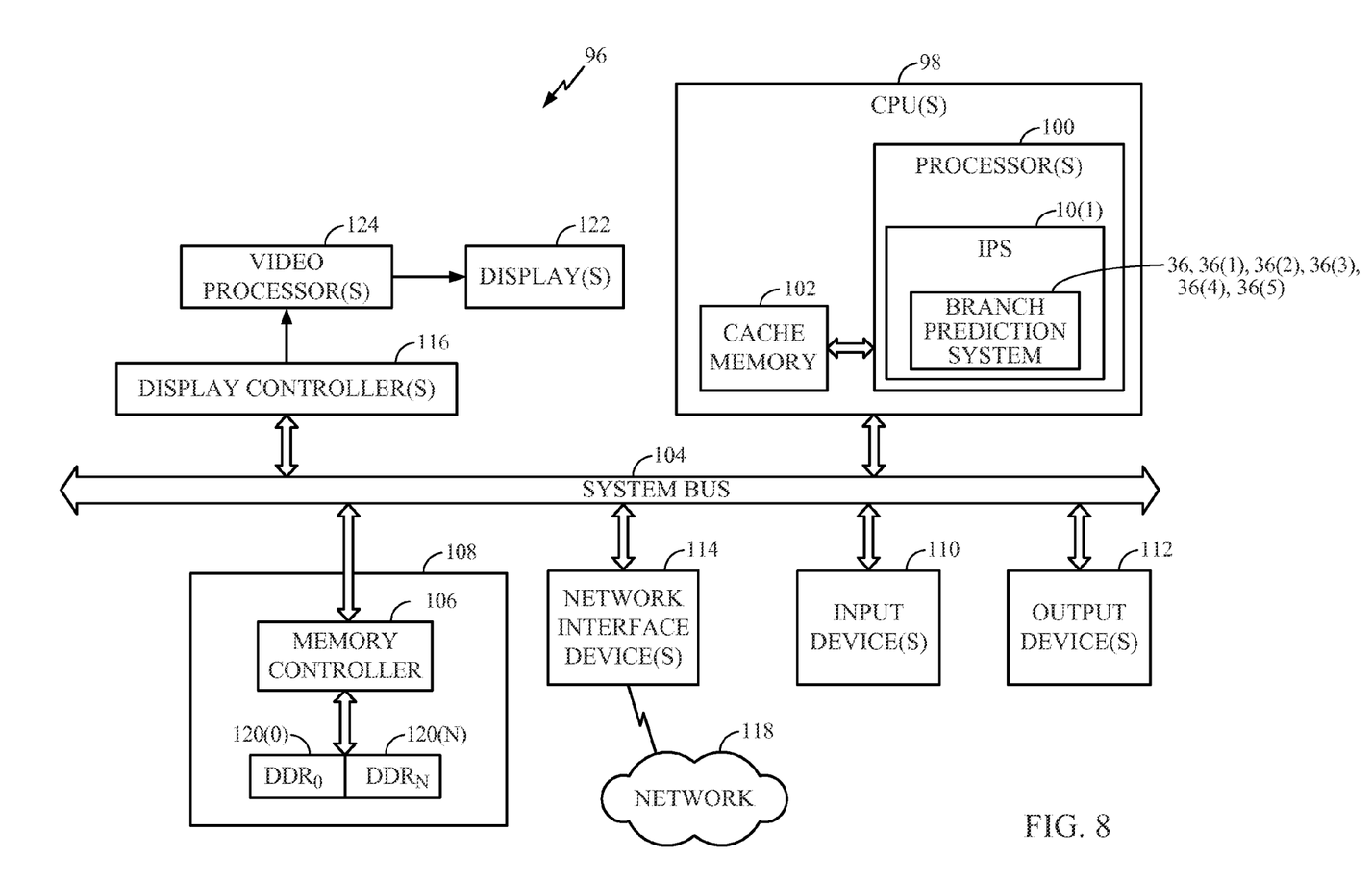
FIG. 8 is a block diagram of an exemplary processor-based system that can include the instruction processing systems according to this disclosure, including but not limited to the branch prediction systems and/or branch history management circuits of FIGS. 2, and 4-7, for managing branch history(ies) used for branch prediction.

In this regard, FIG. 8 illustrates an example of a processor-based system 96. The processor-based system 96 comprises one or more central processing units (CPUs) 98, each including one or more processors 100. The one or more processors 100 may comprise an instruction processing system (IPS) 10(1). The instruction processing system 10(1) may comprise any combination of the embodiments disclosed herein, as non-limiting examples, the branch prediction systems 36, (as non-limiting examples, the branch prediction systems 36(1)-36(5)) in FIGS. 2 and 4-7, respectively. The CPU(s) 98 may have cache memory 102 coupled to the processor(s) 100 for rapid access to temporarily stored data. The cache memory 102 may be used as the cache 58. The CPU(s) 98 is coupled to a system bus 104 and can intercouple master devices and slave devices included in the processor-based system 96. As is well known, the CPU(s) 98 communicates with these other devices by exchanging address, control, and data information over the system bus 104. For example, the CPU(s) 98 may communicate bus transaction requests to a memory controller 106, as an example of a slave device. Although not illustrated in FIG. 8, multiple system buses 104 could be provided.

Other master and slave devices can be connected to the system bus 104. As illustrated in FIG. 8, these devices can include a memory system 108, one or more input devices 110, one or more output devices 112, one or more network interface devices 114, and one or more display controllers 116, as examples. The input device(s) 110 can include any type of input device, including but not limited to input keys, switches, voice processors, etc. The output device(s) 112 can include any type of output device, including but not limited to audio, video, other visual indicators, etc. The network interface device(s) 114 can be any devices configured to allow exchange of data to and from a network 118. The network 118 can be any type of network, including but not limited to a wired or wireless network, a private or public network, a local area network (LAN), a wide local area network (WLAN), and the Internet. The network interface device(s) 114 can be configured to support any type of communication protocol desired. The memory system 108 can include one or more memory units 120(0-N).

The CPU(s) 98 may also be configured to access the display controller(s) 116 over the system bus 104 to control information sent to one or more displays 122. The display controller(s) 116 sends information to the display(s) 122 to be displayed via one or more video processors 124, which process the information to be displayed into a format suitable for the display(s) 122. The display(s) 122 can include any type of display, including but not limited to a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a digital signal processor (DSP), an Application Specific Integrated Circuit (ASIC), a field-programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a compact disc read-only memory (CD-ROM), or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A branch history management circuit to manage at least one branch prediction table (BPT) used for branch prediction by a central processing unit (CPU) instruction processing system, configured to:
   in response to execution of a branch prediction table swap instruction, swap a current branch direction history set used for branch prediction in the at least one BPT with one of a plurality of prior branch direction history sets stored in a cache.

2. The branch history management circuit of claim 1, wherein the at least one BPT comprises at least one BPT entry comprising a prediction indicator to predict a branch direction of a branch instruction.

3. The branch history management circuit of claim 2, further comprising a BPT access circuit configured to:
   update the at least one BPT entry based on branch resolutions provided from a branch resolution circuit; and provide a selected at least one BPT entry to a branch prediction circuit for use in predicting the branch direction of the branch instruction.

4. The branch history management circuit of claim 1, wherein the branch history management circuit is further configured to set and maintain a BPT validity indicator as invalid when swapping the current branch direction history set in a single BPT with the one of the plurality of prior branch direction history sets stored in the cache.

5. The branch history management circuit of claim 4, further configured to apply a backward taken, forward not-taken (BTFNT) rule to predict a branch direction of a branch instruction if the BPT validity indicator is set to invalid.

6. The branch history management circuit of claim 1, wherein the at least one BPT comprises an active BPT and a shadow BPT; and
wherein the branch history management circuit is further configured to set a current BPT register to indicate which of the at least one BPT is the active BPT.

7. The branch history management circuit of claim 6, further configured to:
update an entry of the active BPT in response to receiving a branch resolution; and
provide a selected entry of the active BPT for branch prediction.

8. The branch history management circuit of claim 7, configured to:
in response to the execution of the branch prediction table swap instruction:
load the one of the plurality of prior branch direction history sets into the shadow BPT; and
set the current BPT register to change the shadow BPT to the active BPT.

9. The branch history management circuit of claim 1, configured to:
receive a branch prediction table swap indication in response to the execution of the branch prediction table swap instruction; and
in response to the receipt of the branch prediction table swap indication:
evict the current branch direction history set from the at least one BPT;
load the one of the plurality of prior branch direction history sets into the at least one BPT; and
store the evicted current branch direction history set to the one of the plurality of prior branch direction history sets.

10. The branch history management circuit of claim 9, configured to store an address of a prior branch direction history set of the plurality of prior branch direction history sets in the cache which was most recently loaded into the at least one BPT into a BPT address register.

11. The branch history management circuit of claim 10, configured to store the evicted current branch direction history set to the prior branch direction history set addressed by the BPT address register.

12. The branch history management circuit of claim 1, further comprising a BPT store queue configured to:
receive an evicted current branch direction history set from the at least one BPT; and
store the evicted current branch direction history set to the one of the plurality of prior branch direction history sets.

13. The branch history management circuit of claim 1, configured to swap the current branch direction history set by:
receiving an address operand of the branch prediction table swap instruction;

selecting the one of the plurality of prior branch direction history sets based on the address operand; and
accessing the selected one of the plurality of prior branch direction history sets in the cache as the at least one BPT.

14. A means for providing branch history management for managing at least one branch prediction table (BPT) used for branch prediction by a central processing unit (CPU) instruction processing system, comprising:
a means for, in response to execution of a branch prediction table swap instruction, swapping a current branch direction history set used for branch prediction in at least one BPT with one of a plurality of prior branch direction history sets stored in a cache.

15. The means for providing branch history management of claim 14, further comprising:
a means for receiving a branch prediction table swap indication in response to the execution of the branch prediction table swap instruction; and
a means responsive to the receipt of the branch prediction table swap indication, comprising:
a means for evicting the current branch direction history set from the at least one BPT;
a means for loading the one of the plurality of prior branch direction history sets into the at least one BPT; and
a means for storing the evicted current branch direction history set to the one of the plurality of prior branch direction history sets.

16. The means for providing branch history management of claim 14, wherein the means for swapping the current branch direction history set comprises:
a means for receiving an address operand of the branch prediction table swap instruction;
a means for selecting the one of the plurality of prior branch direction history sets based on the address operand; and
a means for accessing the selected one of the plurality of prior branch direction history sets in the cache as the at least one BPT.

17. A method of operating a branch history management circuit to manage at least one branch prediction table (BPT) used for branch prediction by a central processing unit (CPU) instruction processing system, comprising:
in response to execution of a branch prediction table swap instruction, swapping a current branch direction history set used for branch prediction in the at least one BPT with one of a plurality of prior branch direction history sets stored in a cache.

18. The method of claim 17, further comprising setting and maintaining a BPT validity indicator as invalid when swapping the current branch direction history set in a single BPT with the one of the plurality of prior branch direction history sets stored in the cache.

19. The method of claim 17, further comprising:
receiving a branch prediction table swap indication in response to the execution of the branch prediction table swap instruction; and
in response to the receipt of the branch prediction table swap indication:
evicting the current branch direction history set from the at least one BPT;
loading the one of the plurality of prior branch direction history sets into the at least one BPT; and
storing the evicted current branch direction history set to the one of the plurality of prior branch direction history sets.

20. The method of claim 17, further comprising:
receiving the evicted current branch direction history set from the at least one BPT;
storing the evicted current branch direction history set to the one of the plurality of prior branch direction history sets;
enqueuing the evicted current branch direction history set to a BPT store queue; and
dequeuing the evicted current branch direction history set from the BPT store queue.

21. The method of claim 17, wherein swapping the current branch direction history set comprises:
receiving an address operand of the branch prediction table swap instruction;
selecting the one of the plurality of prior branch direction history sets based on the address operand; and
accessing the selected one of the plurality of prior branch direction history sets in the cache as the at least one BPT.

22. A cache configured to:
store a plurality of prior branch direction history sets; and
in response to execution of a branch prediction table swap instruction:
provide one of the plurality of prior branch direction history sets into a branch prediction table (BPT) to be used as a current branch direction history set by a branch prediction circuit in a central processing unit (CPU); and
store an evicted branch direction history set evicted from the BPT to the one of the plurality of prior branch direction history sets.

23. The cache of claim 22, wherein the BPT comprises a pattern history table (PHT).

24. A branch prediction system for performing branch prediction in a central processing unit (CPU) instruction processing system, comprising:
a cache configured to:
store a plurality of prior branch direction history sets;
in response to execution of a branch prediction table swap instruction:
provide one of the plurality of prior branch direction history sets into a branch prediction table (BPT) to be used as a current branch direction history set by a branch prediction circuit in a CPU; and
store an evicted branch direction history set evicted from the BPT to the one of the plurality of prior branch direction history sets; and
a branch history management circuit configured to:
in response to the execution of the branch prediction table swap instruction, swap the current branch direction history set used for branch prediction in at least one BPT with the one of the plurality of prior branch direction history sets stored in the cache.

25. The branch prediction system of claim 24, further comprising a branch resolution circuit configured to:
detect committed branch instructions among a plurality of committed instructions; and
provide branch resolutions of the committed branch instructions to the branch history management circuit for updating the at least one BPT of the branch history management circuit.

26. The branch prediction system of claim 25, wherein the branch resolution circuit is further configured to receive the plurality of committed instructions from an instruction commit circuit of an instruction processing system.

27. The branch prediction system of claim 24, wherein the branch prediction circuit is further configured to provide a prediction of a branch direction of a branch instruction prior to execution of the branch instruction based on a selected entry of the at least one BPT.

28. The branch prediction system of claim 27, wherein the branch prediction circuit is further configured to provide the prediction of the branch direction of the branch instruction to at least one from the group consisting of: a fetch circuit of an instruction processing system and a decoding circuit of the instruction processing system.

29. The branch prediction system of claim 24, disposed in an instruction processing system.

30. A non-transitory computer-readable medium having stored thereon computer-executable instructions comprising at least one branch prediction table swap instruction, to cause a processor to implement a method of operating a branch history management circuit, comprising:
in response to execution of the at least one branch prediction table swap instruction, swapping a current branch direction history set used for branch prediction in at least one branch prediction table (BPT) with one of a plurality of prior branch direction history sets stored in a cache.

* * * * *